United States Patent [19]

Kawano et al.

[11] 3,918,627
[45] Nov. 11, 1975

[54] METHOD OF MANUFACTURING A WELDED TYPE FRANCIS RUNNER

[75] Inventors: Michitada Kawano; Hideo Ito; Tadashi Jimbo; Hidenori Tonooka; Tetsuo Okuni, all of Hitachi; Shunichi Fukasu, Tokyo, all of Japan

[73] Assignee: Hitachi, Ltd., Japan

[22] Filed: Jan. 11, 1974

[21] Appl. No.: 432,519

Related U.S. Application Data

[60] Division of Ser. No. 146,068, May 24, 1971, Pat. No. 3,797,965, which is a continuation-in-part of Ser. No. 854,220, Aug. 29, 1969, abandoned.

[30] Foreign Application Priority Data

Sept. 2, 1968    Japan.............................. 43-76236

[52] U.S. Cl............................. 228/178; 29/156.8 R
[51] Int. Cl.².......................................... B23K 31/02

[58] Field of Search..... 29/471.1, 156.8 B, 156.8 H, 29/156.8 R, 156.8 CF

[56] References Cited

UNITED STATES PATENTS

| | | | |
|---|---|---|---|
| 1,917,037 | 7/1933 | Jessop........................... | 29/156.8 R |
| 2,889,615 | 6/1959 | Stalker.......................... | 29/156.8 H |

*Primary Examiner*—Donald G. Kelly
*Assistant Examiner*—Maragret M. Joyce
*Attorney, Agent, or Firm*—Craig & Antonelli

[57] ABSTRACT

A method of manufacturing a welded type Francis runner adapted to be sectionalized into a plurality of units for transportation wherein the crown ring and the band ring of said runner are sectionalized along a plane in the direction of the axis of said runner, but the blades of said runner are not sectionalized.

9 Claims, 7 Drawing Figures

METHOD OF MANUFACTURING A WELDED TYPE FRANCIS RUNNER

CROSS-REFERENCE TO RELATED APPLICATION

This application is a divisional application of the co-pending U.S. Pat. application Ser. No. 146,068 filed on May 24, 1971 now U.S. Pat. No. 3,797,965, issued Mar. 19, 1974, which is a continuation-in-part of Ser. No. 854,220, filed on Aug. 29, 1969, now abandoned.

BACKGROUND OF THE INVENTION

Recently more larger and larger machinery and equipment are installed in hydraulic power plants, and the runners accordingly become large size so that there arises the problem for transportation of runners.

In general many runners each comprising a crown ring, a plurality of runner blades and a band ring, are made of cast-steel, but in case of very large runners there arises the difficulty of casting each component part into one piece and of transporting such large size runners to the power plants. To overcome this difficulty, the runners have been previously sectionalized into a plurality of units for transportation to the power plants where the units are assembled into a runner by welding or other manners.

In the conventional Francis type runners their blades are also sectionalized at the same time that the runners are sectionalized and assembled by welding at the power plants or installation sites. However, the runner blades have a very complex profile and are easily susceptible to distortions when welded, so that they are difficult to be assembled exactly as designed. Therefore, the efficiency is inevitably dropped. Furthermore welding is followed by laborious hand-finishing the surface of the blade, especially the welded joints, which for example takes about 8,000 hours in case of a unit as large as 160,000 kilowatts. To overcome this problem, there has been proposed a method in which the blades are not sectionalized and the crown ring and the band ring are sectionalized by a plurality of planes containing the lines along which the runner blades are welded to the crown and band rings. However, this method has been found unsatisfactory because of the complex contour of the runner blades. In general the sectionalized units are assembled together by bolting flanges provided on the units respectively or welding, but when the runner is sectionalized by the planes containing the lines along which the blades are joined to the crown and band rings as described above, it is extremely difficult to form these flanges. Furthermore, it becomes difficult to align the axis of the bolt with the direction in which the centrifugal force produced when the runner is rotated exerts upon the units. Even when welding is employed instead of bolting for assembly of the units, it is apparent that welding may be much simplified when the weld lines are straight rather than curved.

As described above, many difficulties arise in fabrication of very large runners so that there has been employed a method for sectionalizing or subassembling the crown and band rings of the runners and welding these subassemblies and the runner blades into a runner. Meanwhile, in order to reduce the weight of large size runners, there has been proposed to use the hollow runners. In this manner, the large capacity presses must be employed in order to form a crown ring from one steel plate so that the very large dies must be prepared, but they are very expensive. Therefore, it is desired to press-form steel plates by a small press. The same is true in case of the hollow large blades formed by putting two sheets of steel plate together.

SUMMARY OF THE INVENTION

Therefore one of the objects of the present invention is to provide a method of manufacturing a welded type Francis runner comprising subassemblies which may be transported in a simple manner and assembled together on an installation site by welding without adversely thermally affecting the blades.

Another object of the present invention is to provide a method of manufacturing a welded type Francis runner light in weight compared to its dimmensions.

Briefly stated, the present invention provides a welded type Francis runner adapted to be sectionalized into a plurality of units in which its crown ring and band ring are sectionalized along a plane in the direction of the axis of the runner, but the runner blades are not sectionalized by this plane.

DESCRIPTION OF THE PREFERRED EMBODIMENT

Figure 1:
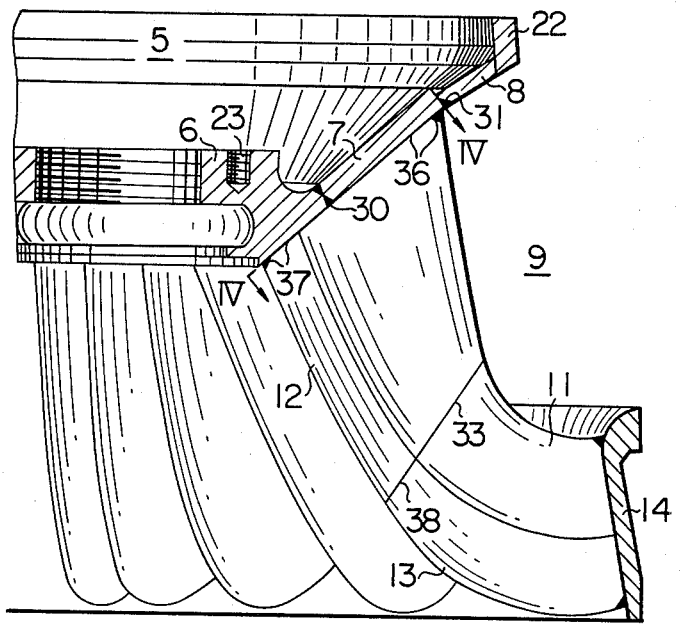
FIG. 1 is a side view illustrating a subassembly which comprises one-half of a welded type Francis runner in accordance with the present invention.
Figure 2:
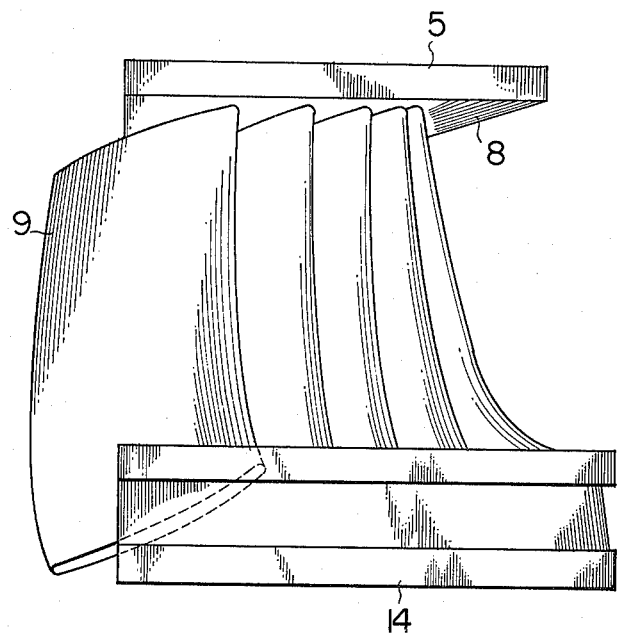
FIG. 2 is a side view illustrating a subassembly which comprises one-quarter of a welding type Francis runner in accordance with the present invention.
Figure 3:
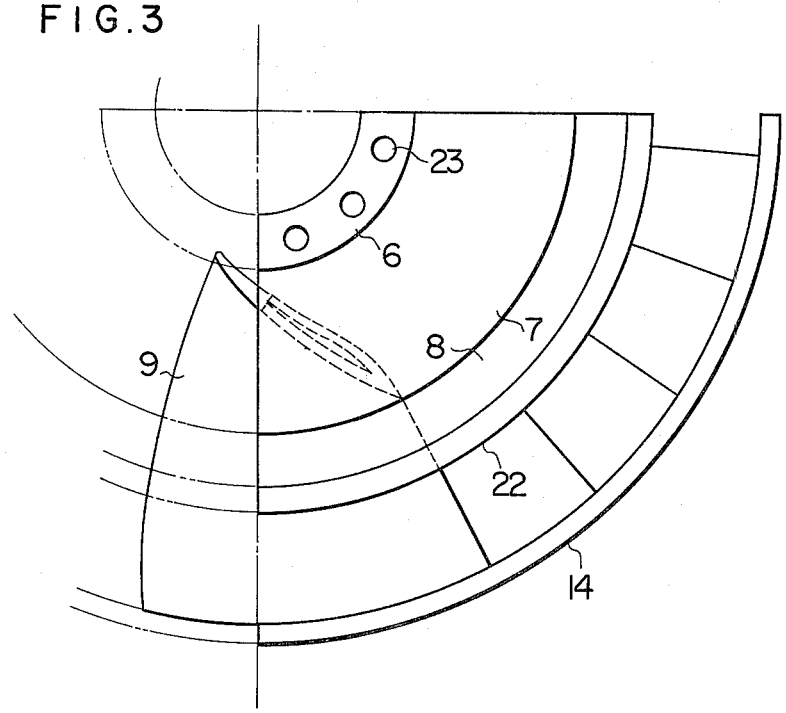
FIG. 3 is a top view thereof.
Figure 7:
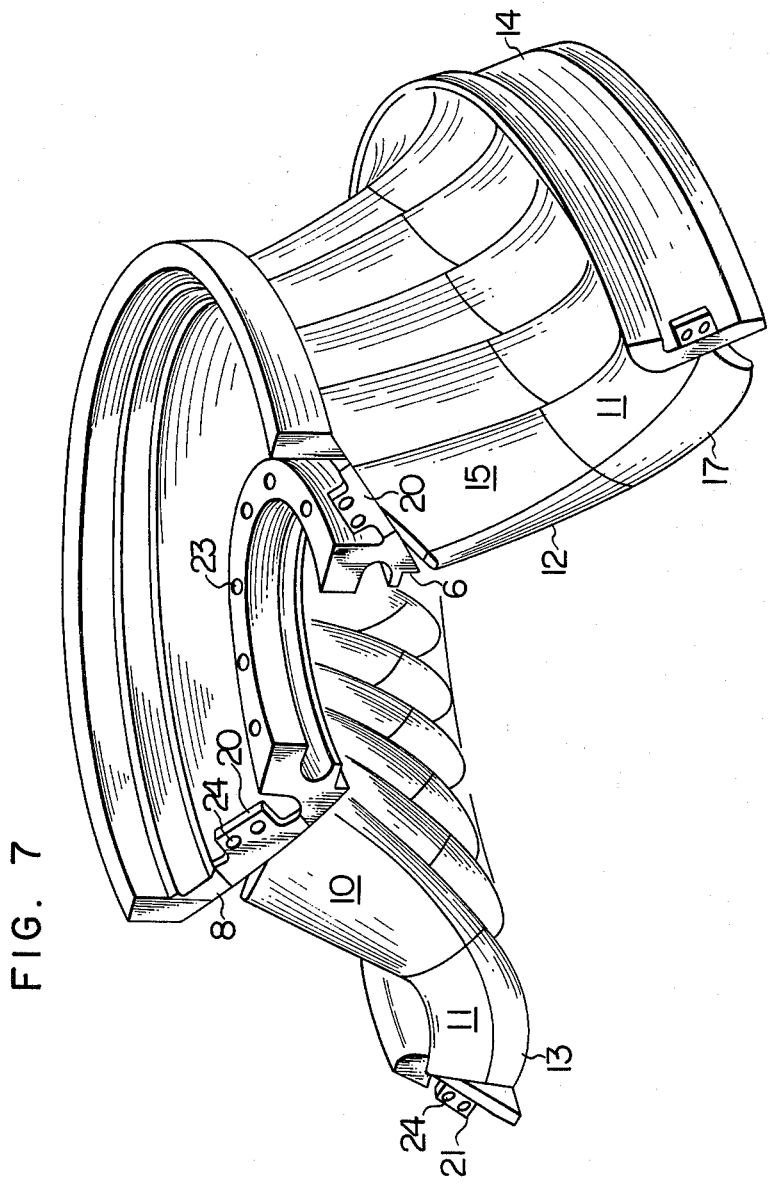
FIG. 7 is a perspective view illustrating a subassembly which comprises one-half of a welded type Francis runner in accordance with the present invention.

Referring to FIG. 1, a crown ring generally indicated by 5 comprises a runner boss 6 of cast steel having a plurality of internally threaded holes 23 which are used for mounting the crown ring 5 on a shaft (not shown), a ring 7 consisting of a plurality of steel plates, which are welded together and to the outer periphery of the boss 6 at 30 and an outer peripheral ring 8 which consists of a plurality of structural members welded together and to the outer periphery of the ring 7 at 31 and has a cylindrical seal 22 extending from the outer periphery of the ring 8 in parallel with the axis of the runner. The cylindrical seal 22 serves to prevent a large amount of water from entering into the interior of the runner. To facilitate the transportation of the welded type Francis runner, it is linearly sectionalized or subassembled into one half as shown in FIGS. 1 and 7 or into one quarter as shown in FIGS. 2 and 3, and these sectionalized or subassembled structural members are welded together or joined together at flanges 20 by bolts and nuts at a plant.

Figure 6:
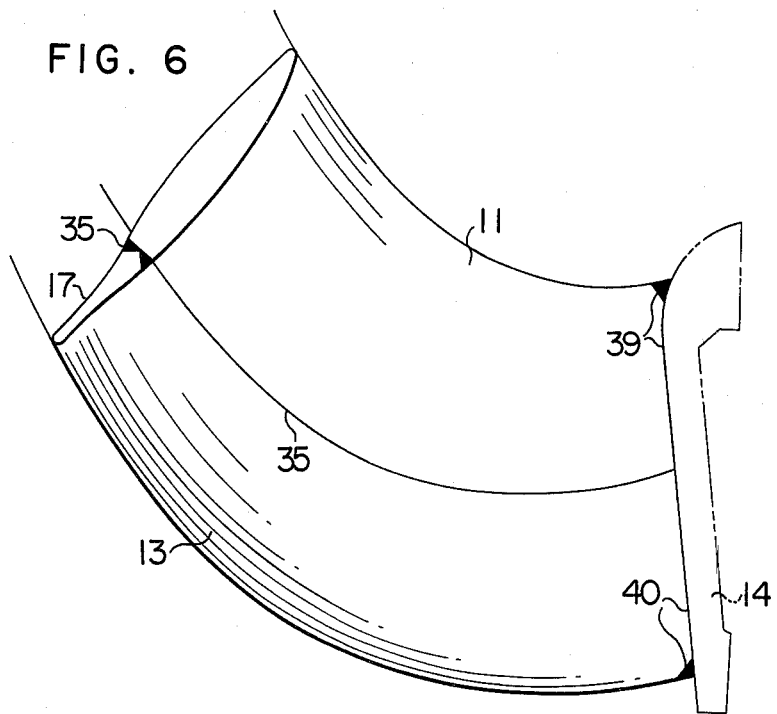
FIG. 6 is a fragmentary perspective view illustrating a portion of the runner blade nearer to the band ring.
Figure 4:
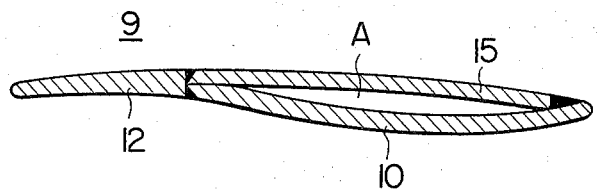
FIG. 4 is a sectional view taken along the line IV — IV of FIG. 1.
Figure 5:
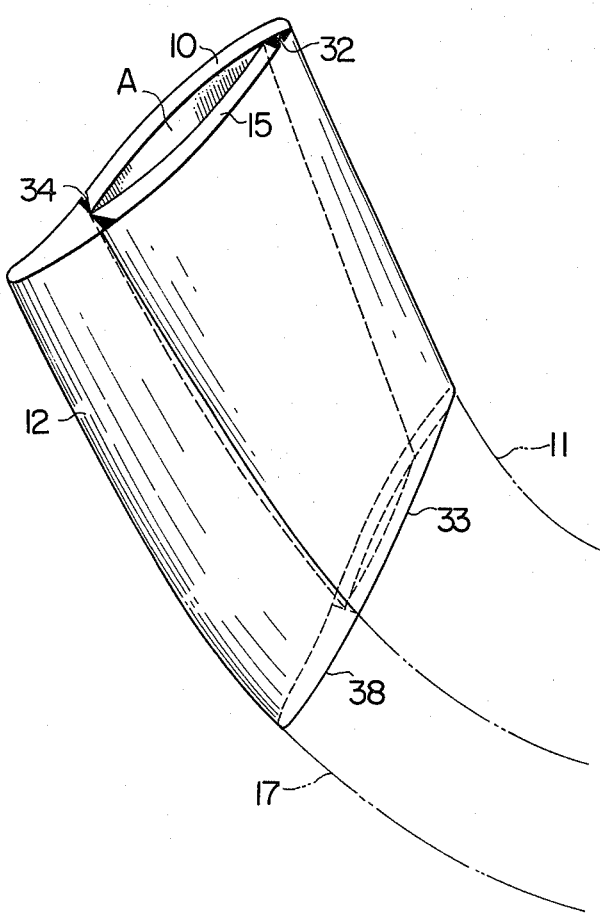
FIG. 5 is a fragmentary perspective view illustrating a portion of a runner blade nearer to the crown ring.

A plurality of runner blades 9, the detail of which are illustrated in FIGS. 4 – 6, are welded at 36 to the undersurface of the crown ring 5, which is assembled into a unitary construction as described above. Each of the runner blades 9 comprises steel plates 10, 12, 15 and 17 which are press-formed into a predetermined shape, a cast-steel member 11 and a stainless steel member 13 over layed upon one surface of the steel plate 17 by explosion welding. As shown in FIG. 5, the steel plates 10 and 15, which are pressformed to have a predetermined profile and a hollow A, are welded together at 32. It is noted that the width of the hollow A is gradually reduced toward a band ring 14 as indicated by the broken lines in FIG. 5 and that the cast-steel member 11, which is welded to the steel plates 10 and 15, is not provided with a hollow. The reasons why the runner blades are formed in such manner as described above are that the high pressure generally exerts on the blades 9 on the side of the crown ring 5 while the low pressure on the side of the band ring 14 so that the thickness of the blade at one end thereof to be joined to the crown ring 5 must be increased as practicably as possible to increase the strength at the joint, but the section of the blade on the side of the band ring 14 may have a sufficiently high strength even though its thickness is too thin to form a hollow.

The pressed-steel plates 12 and 17 are welded to the discharge sides of the steel plates 10 and 15 and the cast steel member 11 at 34 and 35 respectively. One end of the steel plate 12 is welded to the runner boss 6 at 37 while the other end to the steel plate 17 at 38, thereby forming the discharge section of the blade 9. As previously described, the stainless steel plate 13 is welded upon the face of the steel plate 17 by explosion welding, and this face is the rear surface of the steel plate 17 relative to the direction of water flow. The stainless steel 13 welded on the rear face of the steel plate 17 serves to encounter the cavitation. In the type Francis runners, the cavitation generally occurs due to that the blades of this type have a complex profile and that the peripheral speed of the blades on the side of the band ring 14 is greater than that of the blades on the side of the crown ring 5. As a result, negative pressure exerts on the rear surface of the steel plate 17 to cause cavitation.

In the instant embodiment, the stainless steel plate 13 extends approximately one-half of the length of the blade 9, but in actual practice the cavitation occurs at a smaller portion on the side of the band ring 14. In the embodiment the stainless steel plate 13 is shown as being welded to the blade beyond such a small portion at which the cavitation most frequently occurs because the blade of present invention consists of a plurality of sectionalized structural members and the explosion welding is employed as described above. Therefore when the blade is formed from one steel plate, stainless steel may be, for example, overlaid at a portion at which the cavitation tends to occur very often.

In the instant embodiment, the steel plates 12 and 17, which form the discharge section of the blade 9, have their width increased as they approach toward the band ring 14 from the crown ring 5. As described previously, the thickness of the blade is gradually made thinner as it approaches toward the band ring 14 from the crown ring 5. As a consequence, when the steel plates 12 and 17 having the same thickness along the entrance edges are to be welded to the steel plates 10 and 15 and the cast-steel member 11, there is a difference in thickness between them along the weld lines, so that the distortion caused by the weldings is inevitably increased. As shown in FIGS. 3, 4 and 5, the blade 9 has an air foil cross-section so that when the weld line is so selected as to approach nearer to the center-line in the cirection of length of the blade as it approaches toward the band ring 14, the thickness at the discharge edges of the steel plates 10 and 15 and the cast-steel member 11 becomes equal to that of the discharge section forming members 12 and 17. In other words, the width of the members 12 and 17 is gradually increased as they approach toward the band ring 14, whereby they may be welded to the steel plates 10 and 15 and to the cast-steel member 11 with their surfaces flushed and the distortion caused by weldings may be minimized.

The surface of the cast-steel member 11 is hand-finished, but the steel plates 10, 12, 15 and 17 and the stainless steel plate 13 are all press-formed so that the hand finishing may be eliminated. Therefore the time required for fabrication of the blades 9 may be much reduced. If a high-capacity machine press is employed to form one-piece blades the production time may be further reduced. If the hollow A is not preferable from the standpoint of mechanical strength the stiffeners such as round bars may be fixed to the holes formed through the steel plates 10 and 15 to extend across the hollow A and welded to the plates 10 and 15. Thus the blades 9 may be reinforced in a simple manner. The provision of the hollow A is advantageous in that the weight of the blade may be reduced. The discharge-section is of course formed by the use of the plates 10 and 15. In the instant embodiment, however, the steel plates 12 and 17 are employed because the discharge edge is long and because of the welding techniques.

Although in the above-mentioned embodiment the hollow blades are composed of steel plates and casting plates, it goes without saying that the blades can be produced by only the steel plates.

The other ends of the blades 9 whose one ends are welded to the crown ring 5 as described above are welded to the band ring 14. That is, the cast-steel members 11 are welded at deposite metal 39 to the band ring 14 while the steel plates 17 and the stainless steel plates 13 welded on the faces thereof are welded to the band ring 14 at deposite metal 40.

The band ring 14 also consists of a plurality of sectionalized structural members as in the case of the crown ring 5 to facilitate the transportation of the runner. The structural members may be welded or bolted together through holes 24 at flanges 21.

The Francis runner in accordance with the present invention comprises the crown ring 5 and the band ring 14, each of which consists of a predetermined number of sectionalized or subassembled structural units for facilitating the transportation, and a plurality of blades 9 which are secured between the crown ring 5 and the band ring 14 by welding or other fixing manners. The contour of the one end of the blade 9 to be joined to the crown ring 5 is greatly different from that of the other end of the blade 9 to be joined to the band ring 14. In addition, the position of the one end of the blade 9 to be joined to the crown ring 5 is greatly different from that of the other end to be joined to the band ring 14. Therefore, if both of the crown ring 5 and the band ring 14 are sectionalized by one plane, this sectionalizing plane will not pass through both of the joints between the blades 9 and the crown and band rings 5 and 14. However, according to the instant embodiment, the runner is sectionalized into a plurality of structural members by a plurality of planes which are in parallel with the axis of the runner, but the blades 9 are not sectionalized or divided into a plurality of structural members even though they intersect the sectionalizing planes and bridges the adjacent two crown and band ring units 5 and 14.

Both of the ends of the blade 9 which intersects the sectionalizing plane are partly welded to the crown and band ring subassemblies and the portions of the ends of the blade to be joined to the adjoining crown and band ring units are free ends. That is, as shown in FIGS. 2, 3 and 7, some portions of the ends of the blade 9 extend beyond the boundaries of the subassemblies of the crown and band rings 5 and 14 and these extended portions are welded to the adjoining subassemblies at the installation site.

As described above, the subassemblies of the crown and band rings 5 and 14 are prepared by sectionalizing them by vertical planes for facilitating the transportation, but the blades 9 are not sectionalized at all, so that they are not distorted when welded. In addition, it is not necessary to finish the blade members at the installation site, and the welding along the straight weld lines in case of assemblying the crown and band rings may be automated so that the welding time and hence the installation time may be much reduced. Even when the subassemblies are joined together at the flanges 20 and 21, the joining lines are straight so that the bolts may be easily positioned with respect to the direction in which the subassemblies tend to separate from each other under the centrifugal force.

The blades 9 may be constructed by assembling the steel plates and the cast-steel structural members so as to form the hollow portion within the blade at a portion where the thickness of the blade is thick. In addition large runners may be constructed by employing small capacity presses, which means that large runners may be constructed economically.

The subassemblies are assembled by welding or by bolting at the flanges as described above, and in general the subassemblies of the band ring 14 whose wall thickness is thinner than that of the crown ring 5 are welded together while the crown ring subassemblies are joined together by bolting at the flanges. However, when the runners are used in pump turbines, the band ring 14 is longer in the direction at a right angle to the axis of the runner so that the band ring is assembled by bolting. In some cases, both of the subassemblies of the crown and band rings are assembled by welding. However, it should be noted that the blades are welded to the crown and band rings.

It is understood that the blades having hollows, may also be used in the runners of the type in which their crown and band rings do not consist of the subassemblies.

We claim:

1. A method of manufacturing a welded type Francis runner of the type comprising a crown ring and a band ring interconnected by a plurality of blades including the steps of:
   preparing a plurality of runner sections each having a plurality of blades fixed at one end to a section of the crown ring and at the other end to a section of the band ring, at least one of said runner sections being so prepared that all blades except the respective edge blades at the edges of said runner sections are fixedly connected to said respective rings along the full cross-section of the blade ends, said runner section being formed such that the edges of said crown and band ring sections lie in at least one common plane extending through the axis of the runner, said edge blades being connected to said crown and band ring section such that a portion of the cross-section of both edge blade ends extends beyond said ring sections at one side of said common plane,
   and joining said runner sections to one another to form a completed runner.

2. A method according to claim 1, wherein said joining includes joining the extended portions of said edge blades to the rings of the immediately adjacent runner section.

3. A method according to claim 2, wherein said joining includes connecting said edge blades to said rings with deposit metal.

4. A method according to claim 3, wherein said crown ring comprises a runner boss and an outer peripheral ring, said outer peripheral ring and said band ring being made of steel plates, wherein said runner boss is made of cast steel, and wherein said outer peripheral ring is welded to said runner boss.

5. A method according to claim 3, wherein each of said plurality of blades has a hollow portion formed on the side of said crown ring and on the side of the entering flow, said hollow portion being formed by a pair of steel plates which are press-formed into a predetermined contour having a sufficient strength to withstand the water pressure and which are joined together with deposite metal.

6. A method according to claim 3, wherein each of said plurality of blades comprises: a pair of steel plates forming the flow entering section of the blade on the side of said crown ring, said pair of steel plates being joined together to form a hollow portion therebetween; a cast steel member forming the flow entering section of the blade on the side of said band ring; a first steel plate forming the flow discharge section of the blade on the side of said crown ring; a second steel plate forming the flow discharge section of the blade on the side of said band ring, said first and second steel plates being press-formed into predetermined contours respectively; and a stainless steel plate overlaid on the rear surface of said second steel plate relative to the direction of water flow.

7. A method of manufacturing a welded type Francis runner of the type comprising a crown ring and a band ring interconnected by a plurality of blades, including the steps of:
   preparing a plurality of blades and connecting respective ends of said blades to a crown ring and a band ring;
   wherein said step of preparing includes press-forming a pair of steel plates comprising a portion of each of said blades into a predetermined contour wherein said steel plates have sufficient strength to withstand water pressure, forming a hollow portion between said pair of steel plates in each of said blades, positioning the hollow portion in each blade at the part of said blade closest to said crown ring and facing the incoming flow, joining the steel plates together with deposit metal and dimensioning the blades such that the thickness of each of said blades is gradually reduced from the side of said crown ring toward the side of said band ring.

8. A method according to claim 7, wherein said step of preparing further includes: forming the flow entering section of the blade on the side of the blade adjacent said band ring of a cast steel member, press-forming first and second steel plates into predetermined contours respectively, forming the flow discharge section of the blade on the side of the blade adjacent said crown ring of said first steel plate, forming the flow discharge section of the blade on the side of the blade adjacent said band ring of said second steel plate, and overlaying a stainless steel plate on the rear surface of said second steel plate relative to the direction of water flow, the width of said discharge section formed with said first and second steel plates being so increased from the side of said crown ring toward the side of said band ring that said blade has a substantial constant thickness from the side of said crown ring toward the side of said band ring along the line between said discharge section and said entering section formed with said pair of steel plates and said cast steel member.

9. A method according to claim 7, wherein said step of preparing further includes forming the flow discharge section of the blade from a steel plate, and joining said flow discharge section steel plate to the discharge side edge of the steel plates forming the hollow portion.

* * * * *